United States Patent
Trisnadi et al.

(10) Patent No.: US 7,755,604 B2
(45) Date of Patent: Jul. 13, 2010

(54) OPTICAL NAVIGATION SENSOR WITH TRACKING AND LIFT DETECTION FOR OPTICALLY TRANSPARENT CONTACT SURFACES

(75) Inventors: Jahja I. Trisnadi, Cupertino, CA (US); Clinton B. Carlisle, Palo Alto, CA (US); Yansun Xu, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 337 days.

(21) Appl. No.: 11/455,921

(22) Filed: Jun. 19, 2006

(65) Prior Publication Data

US 2007/0291001 A1    Dec. 20, 2007

(51) Int. Cl.
G09G 5/00 (2006.01)
G09G 5/08 (2006.01)
G06F 3/033 (2006.01)

(52) U.S. Cl. .................. 345/156; 345/163; 345/166
(58) Field of Classification Search ......... 345/156–158, 345/163, 166
See application file for complete search history.

(56) References Cited

U.S. PATENT DOCUMENTS

| | | | |
|---|---|---|---|
| 3,922,093 A | 11/1975 | Dandliker et al. | |
| 4,546,347 A | 10/1985 | Kirsch | |
| 4,799,055 A | 1/1989 | Nestler et al. | |
| 5,345,257 A | 9/1994 | Lebby et al. | |
| 5,469,193 A * | 11/1995 | Giobbi et al. | 345/158 |
| 5,473,344 A | 12/1995 | Bacon et al. | |
| 5,578,813 A | 11/1996 | Allen et al. | |
| 5,606,174 A | 2/1997 | Yoshimura et al. | |
| 5,644,139 A | 7/1997 | Allen et al. | |
| D382,550 S | 8/1997 | Kaneko et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Dandliker et al. | |
| 5,781,229 A | 7/1998 | Zediker et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A | 5/1999 | Dandliker et al. | |
| 5,963,197 A | 10/1999 | Bacon et al. | |

(Continued)

OTHER PUBLICATIONS

U.S. Appl. No. 60/702,459, by Theytaz et al. filed Jul. 25, 2005.*

(Continued)

*Primary Examiner*—Alexander S. Beck

(57) ABSTRACT

In one embodiment, an optical navigation sensor for a computer mouse is designed to be operable on an optically transparent material. The optically transparent material may include a contact surface on which the mouse sits during normal operation. An optically rough tracking surface is provided below the contact surface. The mouse includes a light source that illuminates an area on the contact surface and an area on the tracking surface. The mouse may include a tracking sensor onto which the illuminated area on the tracking surface is imaged to detect mouse displacement. The mouse may also include a lift sensor that picks up specular light reflected from the illuminated area on the contact surface to generate lift information indicative of whether the mouse has been lifted off the contact surface. Tracking of the mouse displacement may be qualified with the lift information.

17 Claims, 7 Drawing Sheets

U.S. PATENT DOCUMENTS

| | | |
|---|---|---|
| 5,994,710 A | 11/1999 | Knee et al. |
| 6,031,218 A | 2/2000 | Piot et al. |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,225,617 B1 | 3/2001 | Dandliker et al. |
| 6,233,368 B1 | 5/2001 | Badyal et al. |
| 6,281,882 B1 | 8/2001 | Gordon et al. |
| 6,287,881 B1 | 8/2001 | Siddiqui et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| D464,352 S | 10/2002 | Kerestegian |
| 6,462,330 B1 | 10/2002 | Venkat et al. |
| 6,455,840 B1 | 11/2002 | Oliver et al. |
| 6,476,970 B1 | 11/2002 | Smith |
| 6,529,184 B1 | 3/2003 | Christensen |
| 6,586,158 B2 | 7/2003 | Norskog |
| 6,603,111 B2 | 8/2003 | Dietz et al. |
| 6,621,483 B2 | 9/2003 | Wallace et al. |
| 6,641,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,741,335 B2 | 5/2004 | Green et al. |
| 6,774,351 B2 | 8/2004 | Black |
| 6,774,915 B2 | 8/2004 | Rensberger |
| 6,795,056 B2 | 9/2004 | Norskog et al. |
| 6,809,403 B2 | 10/2004 | Gee |
| 6,809,723 B2 | 10/2004 | Davis |
| 6,819,314 B2 | 11/2004 | Black |
| 6,823,077 B2 | 11/2004 | Dietz et al. |
| 6,977,645 B2 | 12/2005 | Brosnan |
| 7,019,733 B2 * | 3/2006 | Koay ............... 345/163 |
| 7,189,985 B2 * | 3/2007 | Xie et al. ........... 250/559.29 |
| 7,248,345 B2 | 7/2007 | Todoroff et al. |
| 2002/0190953 A1 | 12/2002 | Gordon et al. |
| 2003/0034959 A1 | 2/2003 | Davis et al. |
| 2003/0058506 A1 | 3/2003 | Green et al. |
| 2004/0084610 A1 | 5/2004 | Leong et al. |
| 2004/0189593 A1 | 9/2004 | Koay |
| 2005/0024336 A1 | 2/2005 | Xie et al. |
| 2005/0024623 A1 | 2/2005 | Xie et al. |
| 2005/0035947 A1 | 2/2005 | Lutian |
| 2005/0052411 A1 | 3/2005 | Farag et al. |
| 2005/0057492 A1 | 3/2005 | Bathiche et al. |
| 2005/0083303 A1 | 4/2005 | Schroeder et al. |
| 2005/0156875 A1 * | 7/2005 | Kong ............... 345/156 |
| 2005/0168445 A1 * | 8/2005 | Piot et al. ........... 345/163 |
| 2005/0190157 A1 * | 9/2005 | Oliver et al. ........ 345/166 |
| 2005/0259078 A1 | 11/2005 | Roxlo et al. |
| 2005/0264531 A1 * | 12/2005 | Tai et al. ........... 345/163 |
| 2006/0091301 A1 | 5/2006 | Trisnadi et al. |
| 2007/0008286 A1 * | 1/2007 | Theytaz et al. ...... 345/166 |
| 2007/0164999 A1 * | 7/2007 | Gruhlke ............. 345/166 |
| 2008/0061219 A1 * | 3/2008 | Lee et al. ........... 250/221 |

OTHER PUBLICATIONS

U.S. Appl. No. 60/696,023, by Theytaz et al. filed Jun. 30, 2005.*
International Search Report for International Application No. PCT/US07/13319 (4 sheets).
USPTO Search Report of the Searching Authority for International Application No. PCT/US07/13319 dated Feb. 20, 2008; 5 pages.
USPTO Written Opinion for International Application No. PCT/US07/13319 dated Feb. 20, 2008; 4 pages.
Jahja I.Trisnadi, et al. "Two-Dimensional Comb-Detector Array for Displacement Measurement" U.S. Appl. No. 60/623,320, filed Oct. 29, 2004; 50 pages.
R.E. Kalman "A New Approach to Linear Filtering and Prediction Problems"; Transactions of the ASME Journal of Basic Engineering, 82 (Series D); Copyright 1960, ASME, Research Institute for Advanced Study, Baltimore, MD; 12 pages.
USPTO Requirement for Restriction/Election for U.S. Appl. No. 11/244,650, dated Sep. 15, 2008; 6 pages.
USPTO Notice of Allowance for U.S. Appl. No. 11/261,316 dated Aug. 23, 2006; 6 pages.
USPTO Non-Final Rejection for U.S. Appl. No. 11/261,316 dated Jun. 6, 2006; 6 pages.
USPTO Notice of Allowance for U.S. Appl. No. 11/582,776 dated May 16, 2008; 6 pages.
USPTO Non-Final Rejection for U.S. Appl. No. 11/582,776 dated Sep. 10, 2007; 8 pages.

* cited by examiner

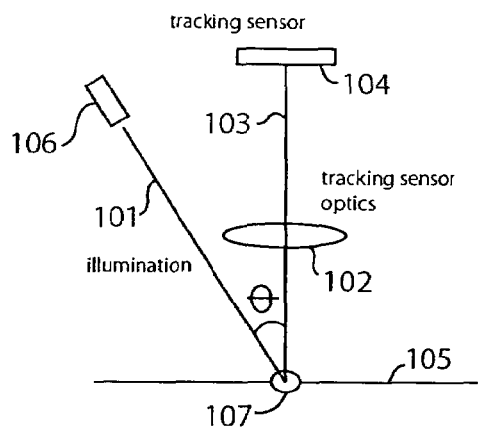
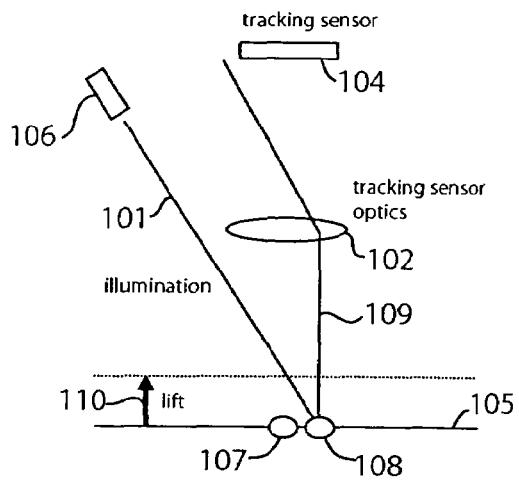
FIG. 1(a)          FIG. 1(b)
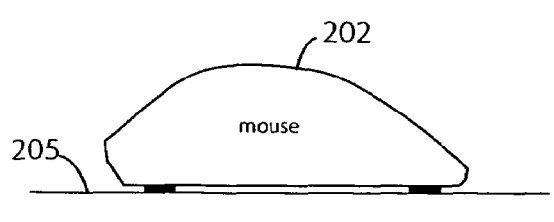
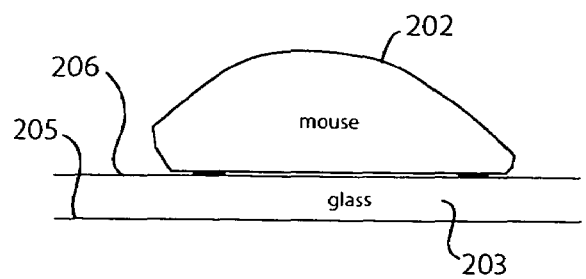
FIG. 2(a)          FIG. 2(b)

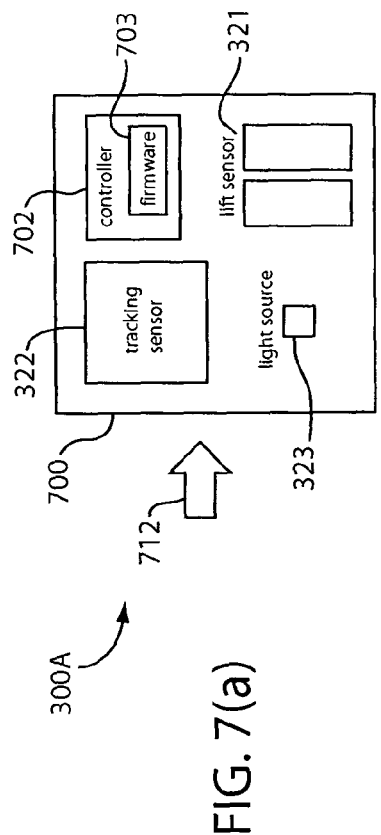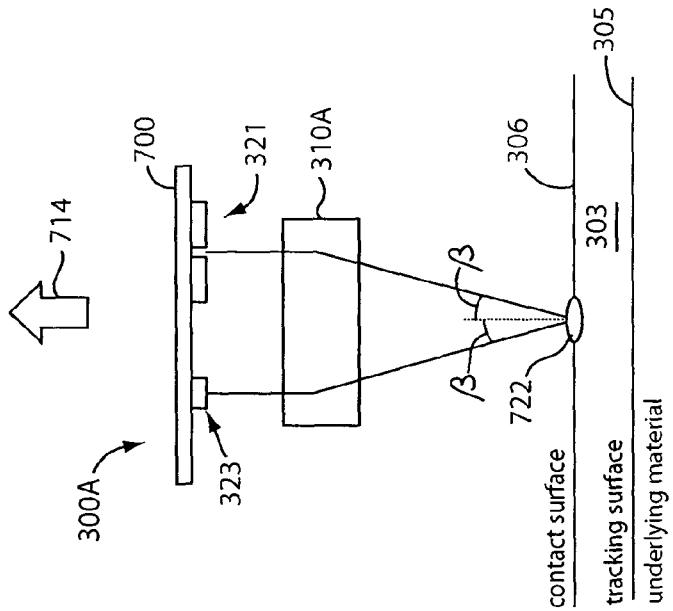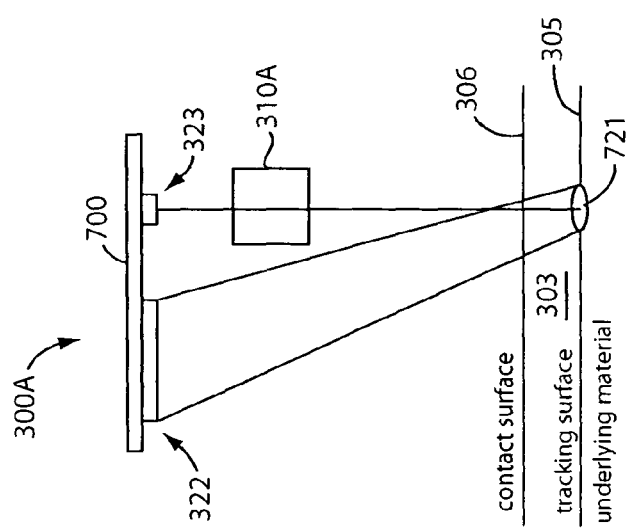
FIG. 7(a)
FIG. 7(b)
FIG. 7(c)

OPTICAL NAVIGATION SENSOR WITH TRACKING AND LIFT DETECTION FOR OPTICALLY TRANSPARENT CONTACT SURFACES

BACKGROUND OF THE INVENTION

1. Field of the Invention

The present invention relates generally to optical navigation sensors, and more particularly to optical pointing devices used in computer systems.

2. Description of the Background Art

A computer mouse is an example of a two-dimensional navigation sensor. As employed with a personal computer, a mouse has an associated cursor displayed on-screen; the cursor moves relative to the mouse's movement. Some mice employ optical, rather than mechanical, technology to track movement. A conventional optical mouse includes a light source that illuminates an optically rough tracking surface at an oblique incident angle. The illuminated portion of the tracking surface is imaged to a tracking sensor, such as a CCD, CMOS imaging array, 2D comb array, etc. A tracking algorithm implemented in the mouse controller analyzes successive captured images or signals to determine mouse displacement along the tracking surface.

Conventional optical mice are designed to track well within a small margin around its nominal design height. Lift detection is implemented to prevent the mouse from tracking when lifted past a certain height threshold. This allows the user to lift and reposition the mouse without moving the cursor. The height threshold may be incorporated in the optical design of the mouse and may be based on image defocus, lateral field of view shift, or both. This works well for tracking surfaces that are directly under the mouse. However, the relatively small lift margin may prevent the mouse from tracking on an optically transparent tracking surface, such as a sheet of glass. This presents a problem in many office and residential applications where desks with sheets of glass are commonplace.

SUMMARY

In one embodiment, a computer optical mouse is designed to be operable on an optically transparent material. The optically transparent material may include a contact surface on which the mouse sits during normal operation. An optically rough tracking surface is provided below the contact surface. The mouse includes a light source that illuminates an area on the contact surface and an area on the tracking surface. The mouse may include a tracking sensor onto which the illuminated area on the tracking surface is imaged. Tracking information from the tracking sensor may be processed to determine displacement of the mouse along a two-dimensional horizontal plane. The mouse may also include a lift sensor that picks up specular light reflected from the illuminated area on the contact surface. The mouse may be configured to track through a range of optically transparent material thicknesses. To allow for lift detection, tracking of the mouse displacement may be qualified with the lift information. When the mouse has been lifted passed a lift limit, tracking of the mouse displacement may be stopped.

These and other features of the present invention will be readily apparent to persons of ordinary skill in the art upon reading the entirety of this disclosure, which includes the accompanying drawings and claims.

DESCRIPTION OF THE DRAWINGS

FIGS. 1(a) and 1(b) schematically illustrate lift detection in a conventional optical mouse design.

FIG. 2(a) schematically illustrates a mouse employed directly on an optically rough tracking surface.

FIG. 2(b) schematically illustrates the mouse of FIG. 2(a) on a contact surface of an optically transparent material.

FIGS. 7(a), 7(b), and 7(c) schematically show various views of an optical mouse in accordance with an embodiment of the present invention.

Figure 3:
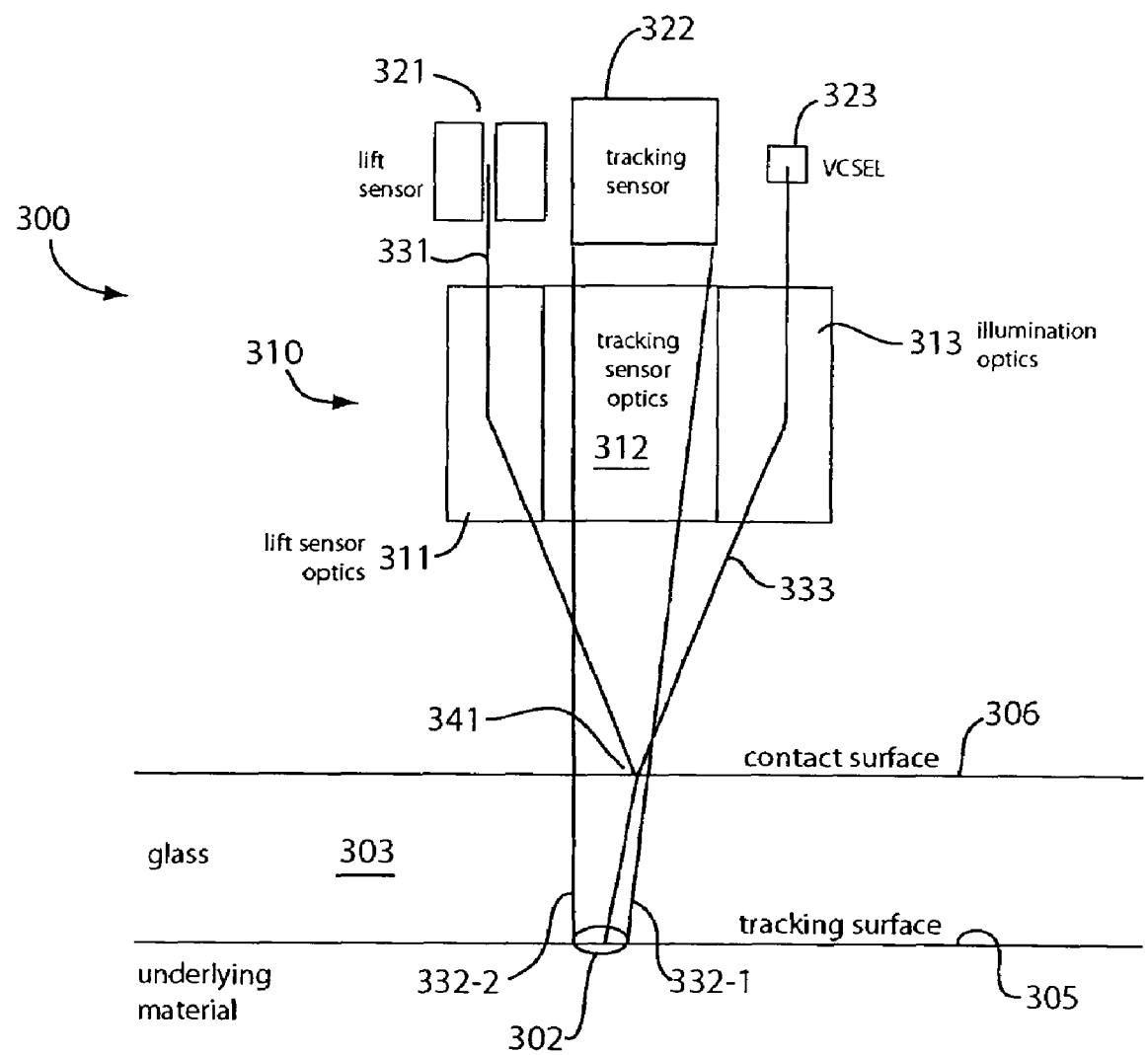
FIG. 3 schematically shows an optical navigation sensor in accordance with an embodiment of the present invention.

The use of the same reference label in different drawings indicates the same or like components. Drawings are not necessarily to scale unless otherwise noted.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are disclosed using computer optical mice as examples. It should be understood, however, that the present teachings are equally applicable to other optical navigation sensors, particularly those used as pointing devices in computer systems.

The present disclosure includes lift detection techniques. Commonly-assigned U.S. Provisional Application No. 60/623,320, filed on Oct. 29, 2004 and U.S. application Ser. No. 11/244,650, filed on Oct. 5, 2005 also pertain to lift detection.

Lift detection in a conventional optical mouse may be implemented with the tracking sensor using a combination of two effects, namely, image defocus and lateral field of view shift. When a mouse is lifted off the tracking surface, the image seen by the tracking sensor loses focus, dropping the image's contrast (visibility) to zero, which causes the mouse to stop tracking. In an optical mouse that uses angled illumination, the lift causes the illuminated area to shift. When the mouse is lifted beyond its lift limit (i.e., designed maximum lift height), the illuminated area will be out of the tracking sensor's field of view, causing the mouse to stop tracking due to a lack of scattered optical signal from the viewed surface area. For speckle-based optical mice that employ coherent light source for illumination, only the second effect, field of view shift, can be used for lift detection because speckle will maintain maximum contrast whether or not the tracking sensor is in an object-image optical relationship (conjugate) with the tracking surface.

FIG. 1, which consists of FIGS. 1(a) and 1(b), schematically illustrates lift detection in a conventional optical mouse design. In FIG. 1, the optical mouse includes a light source 106, a tracking sensor 104, and tracking sensor optics 102. Referring to FIG. 1(a), the light source 106 generates a light beam (represented by line 101) that illuminates an area 107 of an optically rough tracking surface 105. Light (represented by line 103) scattered off the area 107 is mapped onto the tracking sensor 104 by way of the tracking sensor optics 102. The incident angle theta, among other parameters, affects the maximum height the mouse may be lifted before it is unable to track.

FIG. 1(b) shows the mouse being lifted straight up a distance 110 above the area 107. This results in the light source 106 illuminating an area 108 instead of the area 107. In turn, light (represented by line 109) scattered off the area 108 will not image the area 108 onto the tracking sensor 104, preventing the mouse from tracking.

An optical mouse employed on top of an optically transparent material operates similarly to a mouse lifted to a height approximately equal to the thickness of the optically transparent material divided by the glass refractive index. FIG. 2(a) schematically illustrates a mouse 202 employed on an optically rough tracking surface 205. The operational environment of FIG. 2(a) is similar to FIG. 1(a), wherein the mouse is directly on top of the tracking surface.

FIG. 2(b) schematically illustrates the mouse 202 on a contact surface 206. The contact surface 206 is the top surface of an optically transparent material 203, which is a sheet of glass in this example. The typical glass thickness is between 6 mm and 10 mm. Whereas the tracking and contact surfaces are the same surface in FIG. 2(a), they are different surfaces in FIG. 2(b) because of the optically transparent nature of the glass. That is, in FIG. 2(a), the light source of the mouse 202 still illuminates an area on the tracking surface 205 despite the mouse 202 being directly on the contact surface 206. This is similar to the operational environment of FIG. 1(b), wherein the mouse is lifted over the tracking surface at a height approximately equal to the thickness of the glass divided by the glass refractive index.

From the above analysis, it can be seen that a mouse configured to operate on an optically transparent material, such as glass, must satisfy two seemingly contradictory conditions. The first condition is that the mouse needs to be able to track through a wide range of glass thicknesses, from zero (i.e., no glass) to a specified thickness (e.g., 10 mm). The second condition is that the mouse needs to be able to maintain the ability to detect lift from the contact surface within relatively small limits (e.g., lift distance within 2 mm).

In embodiments of the present invention, a mouse meeting both the first and second conditions may be implemented using an optical architecture where imaging optics (e.g., tracking sensor optics) is used to map the illuminated area of the tracking surface to the tracking sensor or where imaging optics is not used, such as when a laser-based light source is employed.

To meet the first condition when imaging optics is employed, the design may have a small illumination incident angle (the glass refractive index may help by a factor of about 1.5), a large beam diameter, and both positive and negative beam shift from the nominal surface height. When no imaging optics is employed, such as in a laser-based optical mouse, light is scattered in the entire hemisphere so the first condition is easily satisfied. Therefore, regardless of whether imaging optics is used or not, the first condition will be met to allow the mouse to track through a large range of glass thicknesses.

To meet the second condition, a lift sensor may be employed to detect lifting of the mouse above a contact surface. A mouse controller (e.g., controller 702 of FIG. 7(a)) may be configured to stop tracking whenever the mouse is lifted at or higher than a predetermined distance (i.e., height) $\Delta h$ above the contact surface. Internally, the tracking sensor may still continue to track because the first condition is satisfied. However, the tracking information may be discarded until the lift distance is under $\Delta h$. This advantageously allows tracking through a range of glass thicknesses while retaining the ability to detect lift. Further details of the present invention are now discussed beginning with FIG. 3.

FIG. 3 schematically shows an optical navigation sensor in accordance with an embodiment of the present invention. In the example of FIG. 3, the optical navigation sensor comprises an optical mouse 300. The optical mouse 300 may include optics 310, a lift sensor 321, a tracking sensor 322, and a light source 323 housed in a mouse body (see body 420 of FIGS. 4(a) and 4(b)). In the example of FIG. 3, during normal operation, the mouse rests on a contact surface 306 of an optically transparent material 303, which is a sheet of glass in the example. The sheet of glass is on an underlying material that provides an optically rough tracking surface 305. The optically rough tracking surface 305 may coincide with the bottom surface of the glass.

The optics 310 may comprise lift sensor optics 311, tracking sensor optics 312, and illumination optics 313. Lift sensor optics 311 may be configured to pick up light reflected off the contact surface 306 and direct that light to the lift sensor 321. In one embodiment, the lift sensor optics 311 is configured to pick up light reflected off the contact surface 306 at the illumination incident angle (see angle $\beta$ in FIG. 7(c)). The tracking sensor optics 312 may be configured to image an illuminated area 302 of the tracking surface 305 onto the tracking sensor 322. In a preferred embodiment, the optics 310 does not include tracking sensor optics 312 because speckle generated by a coherent laser-based light source 323 (e.g., VCSEL) will be present on the tracking sensor without requiring object-image relationship between the tracking surface 305 and the tracking sensor 322. The illumination optics 313 may be configured to collimate light generated by the light source 323 and bend that light towards the surface to be illuminated. As can be appreciated, the optics 310 may be implemented using conventional optical components without detracting from the merits of the present invention.

The light source 323 may be configured to generate a light beam to illuminate the area 302 of the tracking surface 305 and an area on the contact surface 306 (generally labeled as 341). In the example of FIG. 3, the light source 323 comprises a vertical-cavity-surface-emitting laser (VCSEL), which is a coherent laser-based light source.

The tracking sensor 322 may comprise an imaging sensor, such as a CCD, CMOS imaging array, or 2D comb array, for example. Other suitable imaging sensors may also be used without detracting from the merits of the present invention. The area 302 illuminated by the light source 323 is imaged (represented as being bounded by lines 332-1 and 332-2) onto the tracking sensor 322. A tracking algorithm in a controller or a DSP chip (e.g., see controller 702 of FIG. 7(a)) of the mouse 300 analyzes successive captured images to determine displacement of the mouse 300 on a two-dimensional plane that includes the tracking surface 305. The tracking sensor 322, the light source 323, and the tracking optics 312 (if employed) may be configured such that the mouse 300 is able to track within a range of thicknesses of the optically transparent material 303 (e.g., from zero to 10 mm). Because light source 323 is a VCSEL in the example of FIG. 3, the tracking optics 312 may be omitted to advantageously simplify the design. An example tracking algorithm that may be employed includes that disclosed in commonly-assigned U.S. patent application Ser. No. 11/261,316, filed on Oct. 28, 2005, which is incorporated herein by reference in its entirety. Other suitable tracking algorithms may also be employed without detracting from the merits of the present invention.

The lift sensor 321 may comprise multiple photo detectors, such as a bicell or a quadcell. In the example of FIG. 3, the lift sensor 321 comprises a bicell having two photodetectors. Specular beam reflected off the contact surface 306 is imaged onto the bicell comprising the lift sensor 321. The normalized differential output signal of the bicell is indicative of the height the mouse 300 is lifted off the contact surface 306. The tracking algorithm may be configured to stop tracking or to ignore tracking information when the bicell differential output signal indicates that the mouse 300 has been lifted passed a lift limit (i.e., maximum lifting height). In essence, tracking may be gated or qualified using the lift limit. This not only allows the mouse 300 to track through a wide range of glass thicknesses while retaining lift detection capability, but also provides for a programmable lift limit. The lift limit may be programmed by the manufacturer in the factory or by a user in the field. Furthermore, the resulting lift signal is unambiguous and does not require knowledge of previous tracking history.

As can be appreciated, the mouse 300 properly operates when employed directly on top of an optically transparent material or directly on top of an optically rough surface (i.e., without an optically transparent material). In the former case, the mouse 300 operates as previously described. In the latter case, the mouse 300 still operates as previously described except that the contact surface and the tracking surface are the same surface. The mouse 300 thus not only provides a programmable lift limit, but also automatically adapts to different operational environments. Notice that a given setting will result in different lift limit for the two cases, due to light refraction inside glass.

Figure 4A:
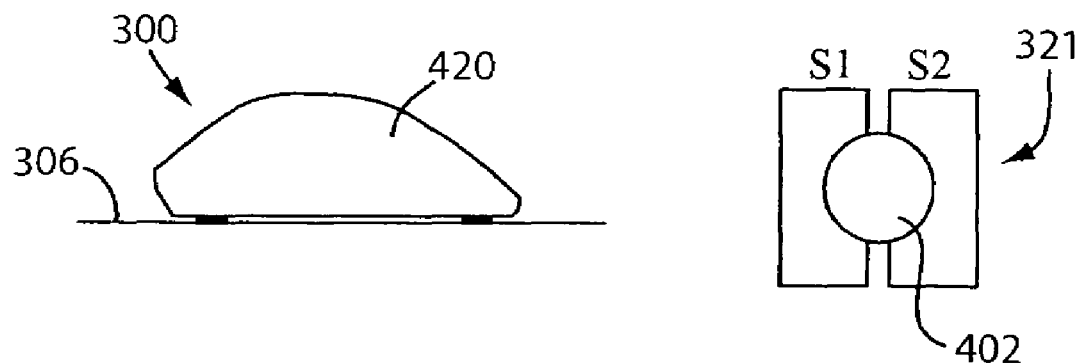
FIGS. 4(a) and 4(b) schematically illustrate the operation of a bicell employed as a lift sensor in accordance with an embodiment of the present invention.
Figure 4B:
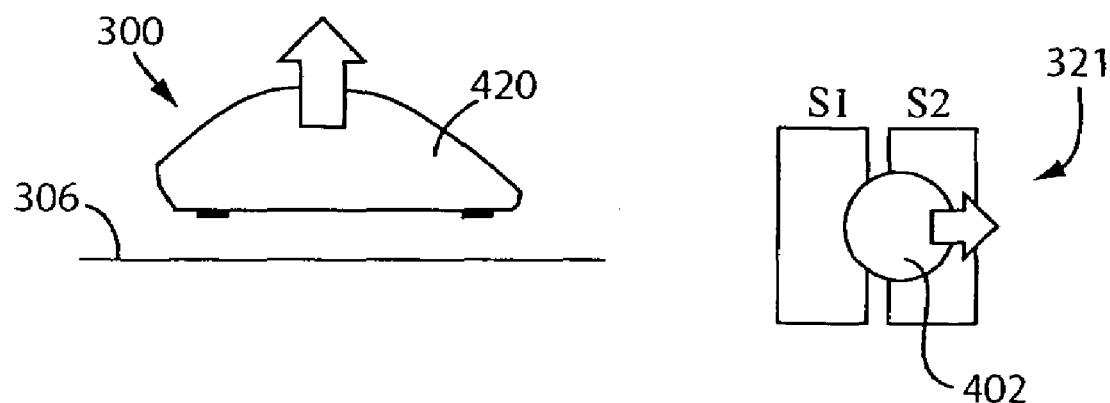

FIG. 4, which consists of FIGS. 4(a) and 4(b), schematically illustrates the operation of a bicell employed as a lift sensor 321. The mouse 300 is shown with its mouse body 420 housing the lift sensor 321, the tracking sensor 322, the light source 323, and the optics 310. In FIG. 4, the two photodetectors of the bicell are labeled as "S1" and "S2." The bicell and the specular beam reflected off the contact surface 306 maybe configured such that the difference of the signals generated by the photodetectors (S1-S2) changes monotonically with lift distance, starting with zero when the mouse 300 is not lifted off the contact surface 306.

Referring to FIG. 4(a), the bicell may be configured such that the beam 402 reflected from the contact surface 306 is between the photodetectors S1 and S2 when the mouse 300 is directly on the contact surface 306. In this example, when there is no (or a relatively small) imbalance between the signals generated by the photodetectors S1 and S2, the mouse 300 is detected as resting on the contact surface 306 (i.e., zero lift distance). Referring to FIG. 4(b), when the mouse 300 is lifted, the beam 402 reflected from the contact surface 306 moves towards one of the photodetectors (S2 in this example), creating an imbalance between the signals generated by the photodetectors S1 and S2. This imbalance may be detected to determine the distance the mouse 300 is lifted off the contact surface 306.

Figure 5:
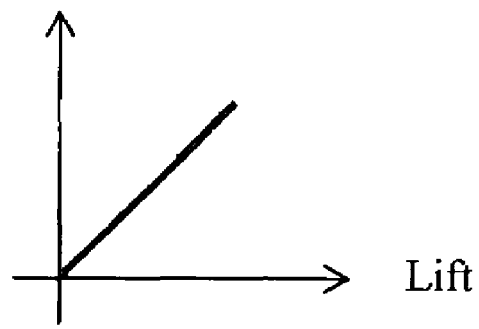
FIG. 5 shows a plot illustrating the dependence of the normalized differential signal of bicell photodetectors on lift distance.

FIG. 5 shows a plot illustrating the dependence of the lift signal, for example, the normalized differential signal of the photodetectors, (S2−S1)/(S2+S1), on lift distance. In the example of FIG. 5, the vertical axis represents the normalized differential signal of the photodetectors, while the horizontal axis represents the lift distance. An example algorithm for setting the lift limit is shown in Table 1.

TABLE 1

If ((S2−S1)/(S2+S1))< Lift_Limit, then (TRACK)
Otherwise (DON'T TRACK)

In the example of Table 1, tracking of displacement of the mouse 300 is enabled when the normalized differential signal of the bicell photodetectors is less than the lift limit ("Lift_Limit") (e.g., 2 mm). When the mouse 300 is lifted a distance higher than the lift limit, tracking of the displacement of the mouse 300 is disabled. In that case, tracking information from the tracking sensor 322 may be discarded or ignored, for example. The algorithm of Table 1 thus allows tracking through a relatively wide range of optically transparent material thicknesses, while retaining lift detection capability by qualifying tracking with lift information from a sensor that picks up specular light reflected from a contact surface, rather than light scattered from a tracking surface, of the optically transparent material. The lift limit is programmable to allow the manufacturer or user to set the height at which two-dimensional surface tracking is disabled, thereby allowing the mouse 300 to be configured for different operational environments.

Figure 6:
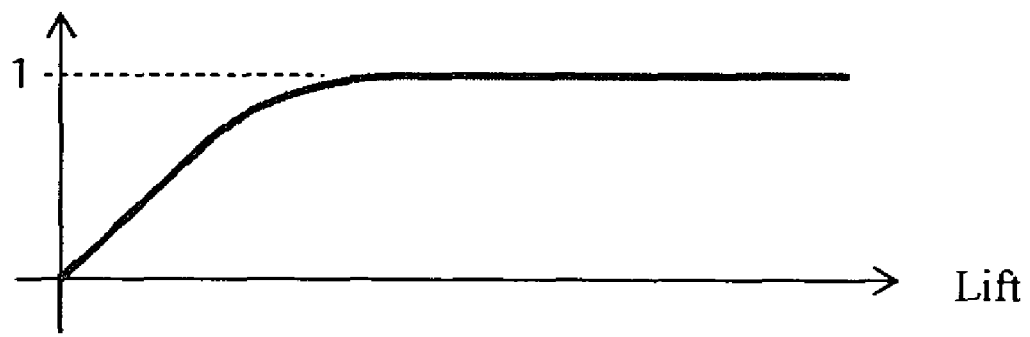
FIG. 6 shows a plot illustrating the dependence of the normalized differential signal of bicell photodetectors on extended lift distance.

In practice, the differential signal of the photodetectors may monotonically increase only within a limited range of lift distances. That is, the differential signal may not increase indefinitely with lift distance. Eventually, as the mouse is lifted, the specular beam reflected from the contact surface may leave one photodetector, then the other photodetector, or leave the field of view of the bicell altogether. For extended lift distances, the differential signal may reach a constant value (unity for normalized differential) as shown in the plot of FIG. 6. In the example of FIG. 6, the vertical axis represents the normalized differential signal of the photodetectors, while the horizontal axis represents the lift distance. The algorithm of Table 1 may be modified as shown in Table 2.

TABLE 2

If [(((S2−S1)/(S2+S1))< Lift_Limit) AND ((S2+S1)>$S_{min}$)],
then (TRACK)
Otherwise (DON'T TRACK)

In the example of Table 2, $S_{min}$ is the lowest non-zero signal that the lift sensor can output (i.e., minimum detectable specular beam) before the output signals of the photodetectors become small enough to make the lift-detection algorithm unstable. The value for $S_{min}$ may be found through sensor calibration or by experimentation and depends on the particular configuration and components employed. As in Table 1, "Lift_Limit" represents a programmable lift limit. In the example of Table 2, tracking of displacement of the mouse 300 is enabled only when the normalized differential signal of the bicell photodetectors is less than the lift limit AND the sum (S2+S1) of the outputs of the photodetectors is greater than $S_{min}$. That is, the minimum signal value $S_{min}$ limits lift detection within a range of distances where the lift algorithm remains stable. Otherwise, the algorithm of Table 2 operates the same way as that of Table 1.

FIG. 7, which consists of FIGS. 7(a), 7(b), and 7(c), schematically show various views of an optical mouse 300A in accordance with an embodiment of the present invention. FIG. 7(a) schematically shows a plan view of the mouse 300A. FIG. 7(b) shows a side view of the mouse 300A as viewed in the direction indicated by an arrow 712, while FIG. 7(c) shows a side view of the mouse 300A as viewed in the direction of an arrow 714. The optical mouse 300A is a specific embodiment of the previously-described optical mouse 300.

Referring to FIG. 7(a), the optical mouse 300A may include the lift sensor 321, the tracking sensor 322, the light source 323, a controller 702, and optics 310A (see FIGS. 7(b) and 7(c)) housed in a mouse body (not shown; but see body 420 in FIG. 4). In one embodiment, the lift sensor 321 (e.g., bicell) and associated amplifiers and the tracking sensor 322 (e.g., 2D comb array) are integrated in the same silicon die. The light source 323 (e.g., VCSEL) and the silicon die containing the lift sensor 321 and the tracking sensor 322 may be packaged in the same lead frame 700. The controller 702 (usually including a DSP block) may be in a separate silicon die that is packaged in the lead frame 700, or integrated in the same silicon die as the lift sensor 321 and the tracking sensor 322. The components schematically shown in FIG. 7(a) are underneath the lead frame 700 and facing the contact surface 306 (see FIGS. 7(b) and 7(c)).

The components forming the lift sensor 321, the tracking sensor 322, and the light source 323, and their operation, have been previously explained with reference to the mouse 300 (see FIG. 3). The controller 702 may comprise programmable and/or non-programmable logic (e.g., ASIC, FPGA, etc.), programmable microcontroller, or other processing component configured to implement a tracking algorithm for tracking displacement of the mouse 300A on a two-dimensional plane and a lift detection algorithm for detecting lifting of the mouse. The controller 702 may include firmware 703 comprising programmable non-volatile memory, such a flash memory. The firmware 703 may include manufacturer or user programmable variables, such as that for setting the lift limit of the algorithms of Tables 1 and 2.

FIG. 7(b) schematically shows the light source 323 illuminating an area 721 of an optically rough tracking surface 305 by way of optics 310A. Optics 310A is a specific embodiment of optics 300 (see FIG. 3) that does not include tracking sensor optics. The illuminated area 721 is imaged onto the tracking sensor 322 for tracking purposes. In this example, the mouse 300A is directly supported on the contact surface 306 of the optically transparent material 303 (e.g., glass), which in turn is supported by an underlying material that provides the optically rough tracking surface 305.

FIG. 7(c) schematically shows the light source 323 also illuminating an area 722 of the contact surface 306 at an illumination incident angle beta ($\beta$). The lift sensor 321 picks up light reflected from the area 722 at the incident angle beta by way of the optics 310A. The lift sensor 321 generates lift information based on the picked up reflected light. The lift information is subsequently processed by the controller 702 to enable or disable tracking using the algorithm of Table 2 (or Table 1), for example.

Figure 8:
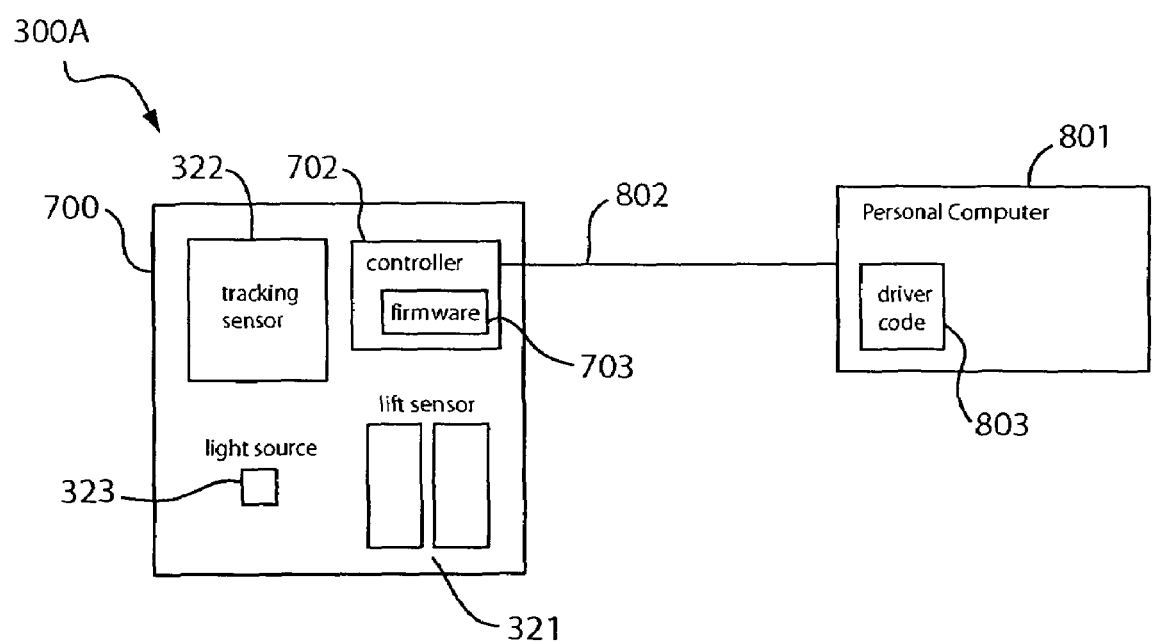
FIG. 8 schematically shows the mouse of FIG. 7(a) being used with a personal computer in accordance with an embodiment of the present invention.

FIG. 8 schematically shows the mouse 300A being used with a personal computer 801. In the example of FIG. 8, the controller 702 is connected to the computer 801 over a bus 802, which may be a Universal Serial Bus (USB) connection, for example. In the computer 801, the driver code 803 may comprise computer-readable program code for driving the mouse 300A, allowing the mouse 300A to be employed by the operating system and application programs. When a user moves the mouse 300A on the contact surface 306, tracking information from the tracking sensor 322 is processed by the controller 702 to determine displacement along a plane that includes the tracking surface 305 (see FIGS. 7(b) and 7(c)). The controller 702 also processes lift information from the lift sensor 321 so as to disable tracking when the lift information indicates that the mouse 300A has been lifted a predetermined distance above the contact surface 306. The controller 702 provides tracking information to the driver code 803, which then moves a corresponding on-screen cursor relative to the displacement of the mouse 300A. The driver code 803 may include a user interface to allow the user to set the lift distance at which the mouse 300A will stop tracking. The user-selected lift distance may be forwarded from the computer 801 to the controller 702 over the bus 802, translated to a lift limit, and then stored in the firmware 703.

Figure 9:
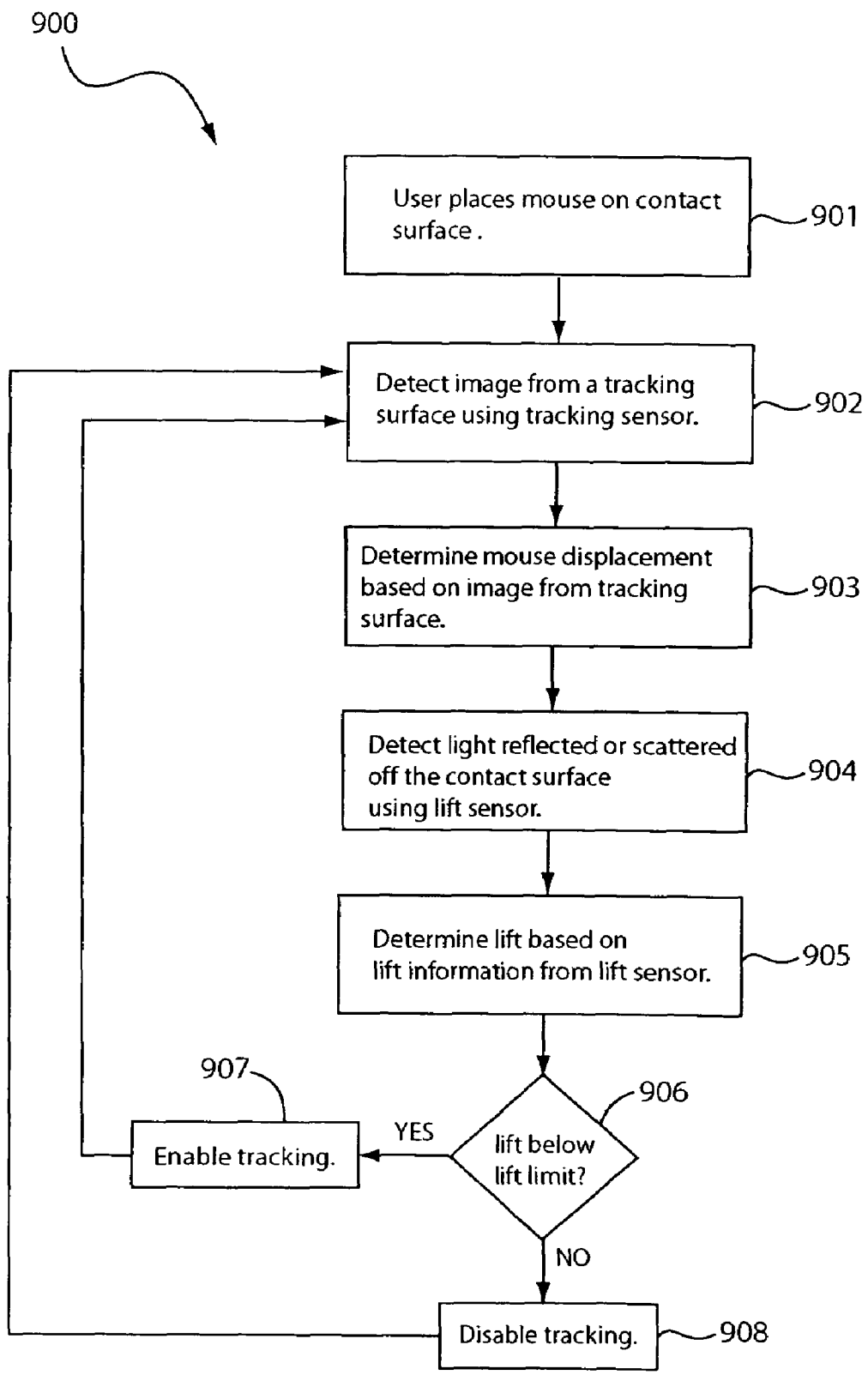
FIG. 9 shows a flow diagram of a method of operating an optical navigation sensor in accordance with an embodiment of the present invention.

Referring now to FIG. 9, there is shown a flow diagram of a method 900 of operating an optical navigation sensor in accordance with an embodiment of the present invention. The method 900 is explained using an optical mouse as an example, not as a limitation. The method 900 may be used with other suitable optical navigation sensors without detracting from the merits of the present invention.

In step 901, the user places the optical mouse on a contact surface, which may or may not be the same as the tracking surface In step 902, a tracking sensor in the optical mouse detects an image from the optically rough (i.e., scatters incident light) tracking surface. The tracking surface may be that of a desk on which the sheet of glass is placed, for example.

In step 903, a controller in the optical mouse determines how much the mouse has been displaced based on the tracking signal generated by the tracking sensor. In the context of mouse usage, mouse displacement refers to movement of the mouse on a two dimensional plane. If the contact surface is a sheet of glass, the two dimensional plane includes the tracking surface. Otherwise, in applications where the tracking surface and the contact surface are the same surface (e.g., no glass), the two dimensional plane is simply the plane on which the mouse sits on.

In step 904, a lift sensor in the optical mouse detects light reflected or scattered off the contact surface. In one embodiment, the lift sensor and tracking sensor are different, separate sensors. The lift sensor may be a bicell or a quadcell or generally multicell, while the tracking sensor may be a 2D comb array, for example.

In step 905, the controller determines the distance, if any, the mouse has been lifted off the contact surface based on lift information from the lift sensor.

In step 906, the lift distance is compared to a lift limit.

In step 907, the controller processes tracking information from the tracking sensor, generates displacement information based on the tracking information, and provides the displacement information to the personal computer to which the optical mouse is connected if the lift distance is less than (or less than or equal to) the lift limit.

In step 908, the controller does not process tracking information from the tracking sensor when the lift distance is greater than (or greater than or equal to) the lift limit. Note that the tracking sensor and associated optical configuration are configured to track through a wide range of thicknesses of optically transparent materials. This allows the optical mouse to track even when employed on top of a sheet of glass, for example. To implement lift detection, a separate lift sensor detects light reflected from the contact surface of the optically transparent material and, in effect, qualifies tracking based on whether the mouse has been lifted off the contact surface. The mouse may thus automatically adapt to different support materials and may be programmed for a particular material if need be.

An improved two dimensional optical navigation sensor has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. An optical navigation sensor comprising;
a light source configured to illuminate a first area on a contact surface of an optically transparent material and a second area on a tracking surface below the contact surface;
a tracking sensor configured to pick up light scattered from the tracking surface to detect displacement of the optical navigation sensor on a two-dimensional plane;
a lift sensor including at least two photo detectors configured to detect specular light reflected or scattered from the contact surface to detect when the optical navigation sensor has been lifted off the contact surface as indicated by a differential output signal from the photodetectors; and
wherein a quotient of the differential output signal from the photodetectors divided by a sum of output signals from the photodetectors is used to qualify whether displacement of the optical navigation sensor is tracked.

2. The optical navigation sensor of claim 1 wherein the lift sensor comprises the photodetectors separate from the tracking sensor.

3. The optical navigation sensor of claim 1 wherein the lift sensor comprises a quadcell.

4. The optical navigation sensor of claim 1 wherein lift limit is programmable by a user in the field.

5. The optical navigation sensor of claim 1 wherein a lift limit is programmable by configuring non-volatile memory in the optical navigation sensor.

6. The optical navigation sensor of claim 1 wherein the tracking sensor and the lift sensor are integrated in a same silicon die.

7. The optical navigation sensor of claim 6 wherein the silicon die and the light source are packaged in a same lead frame.

8. The optical navigation sensor of claim 1 wherein the displacement of the optical navigation sensor is not tracked when the sum of output signals is less than a minimum signal value.

9. A method of operating a computer optical mouse, the method comprising:
using a first sensor to generate tracking information based on light scattered off a tracking surface below a contact surface on which the optical mouse is placed by a user, the contact surface being a top surface of a sheet of glass;
using the tracking information to determine displacement of the optical mouse along a two-dimensional horizontal plane;
using a second sensor including at least two photo detectors to generate a differential output signal from the photodetectors based on specular light reflected off the contact surface;
determining whether the optical mouse has been lifted off the contact surface as indicated by a quotient of the differential output signal from the photodetectors divided by a sum of output signals from the photodetectors; and
prohibiting determination of displacement of the optical mouse along the two-dimensional horizontal plane when the optical mouse has been lifted off the contact surface.

10. The method of claim 9. further comprising:
illuminating the tracking surface and the contact surface with light from a coherent laser-based light source.

11. The method of claim 10. wherein the light source comprises a VCSEL.

12. The method of claim 9. wherein the first sensor and the second sensor are separate sensors.

13. A computer optical mouse comprising:
a light source configured to illuminate a first area on a contact surface of a sheet of glass and a second area on an optically rough surface below the contact surface;
a tracking sensor configured to detect light scattered from the second area to generate tracking information;
a lift sensor including at least two photodetectors configured to detect specular light reflected from the first area to generate a differential output signal. from the photodetectors;
a body housing the light source, the tracking sensor, and the lift sensor, the body resting directly over the sheet of glass; and
a controller configured to track displacement of the computer optical mouse along a two-dimensional horizontal plane using the tracking information and to determine whether the body has been lifted above the sheet of glass as indicated by a quotient of the differential output signal from the photodetectors divided by a sum of output signals from the photodetectors, the controller further configured to qualify the tracking of the displacement of the computer optical mouse with the lift information.

14. The computer optical mouse of claim 13 wherein the light source comprises a VCSEL.

15. The computer optical. mouse of claim 13 wherein the lift sensor comprises a quadcell.

16. The computer optical mouse of claim 13 wherein the controller further includes a programmable firmware.

17. The computer optical. mouse of claim 16 wherein the firmware may be programmed to set a lift limit for lifting the body in a vertical direction, wherein the controller stops the tracking of the displacement of the computer optical mouse when the body has been lifted a vertical distance exceeding the lift limit.

* * * * *